US006603387B1

(12) United States Patent
Addy et al.

(10) Patent No.: US 6,603,387 B1
(45) Date of Patent: Aug. 5, 2003

(54) PROGRAMMING OF RF TRANSMITTER IDENTIFICATION DATA BY MONITORING POWER

(75) Inventors: Kenneth L. Addy, Massapequa, NY (US); Francis C. Marino, Dix Hills, NY (US)

(73) Assignee: Pittway Corp., Chicago, IL (US)

( * ) Notice: Subject to any disclaimer, the term of this patent is extended or adjusted under 35 U.S.C. 154(b) by 0 days.

(21) Appl. No.: 09/335,570

(22) Filed: Jun. 18, 1999

(65) Prior Publication Data

(65)

(51) Int. Cl.[7] .......................... G05B 19/00; G06F 7/00; H04B 3/00

(52) U.S. Cl. .................... 340/5.23; 340/5.25; 340/5.22; 340/539; 340/514

(58) Field of Search ............................... 340/5.23, 5.25, 340/5.22, 539, 514, 5.28, 500, 506; 379/37

(56) References Cited

U.S. PATENT DOCUMENTS 4,855,713 A * 8/1989 Brunius ...................... 340/506
4,859,990 A 8/1989 Isaacman
5,652,566 A * 7/1997 Lambert ..................... 340/507
5,990,786 A * 11/1999 Issa et al. ................... 340/429
6,151,560 A * 11/2000 Jones .......................... 702/58
6,175,601 B1 * 1/2001 Rybicki et al. ............. 375/345
6,288,639 B1 * 9/2001 Addy ......................... 340/539

* cited by examiner

*Primary Examiner*—Brian Zimmerman
*Assistant Examiner*—Vernal Brown
(74) *Attorney, Agent, or Firm*—Anthony R. Barkume, P.C.

(57) ABSTRACT

A device and a method used during installation of a security system that allows the security system control panel to learn the IDs of the wireless transmitters in the security system without receiving an RF transmission from the wireless transmitter. The installation device comprises a power supply means, a first and second interface means, monitoring means for monitoring the current drawn from the power supply means, and processing means for producing a digital signal based on the current monitored. The first interface means connects the power supply means of the installation device to the battery terminal of the transmitter, and the second interface means connects the output of the installation device to the control panel. The monitoring means, comprising a resistor and a comparator, monitors the current drawn from the power supply means, wherein the current drawn corresponds to the data transmitted by transmitter. The resultant digital signal is processed by a microprocessor and transmitted to the control panel via a common interface bus. The control panel then stores the ID of the transmitter.

21 Claims, 4 Drawing Sheets

PROGRAMMING OF RF TRANSMITTER IDENTIFICATION DATA BY MONITORING POWER

BACKGROUND OF THE INVENTION

This invention relates the programming of a security system control panel to enable communication between the wireless transmitters of the security system and the control panel, and in particular to a device and method for entering the identification number of the wireless transmitters to the control panel without receiving a radio frequency transmission from the wireless transmitter.

Most radio frequency (RF) wireless security systems available today, such as those manufactured by ADEMCO, generally employ a multiplicity of wireless transmitter products that transmit RF information to a common receiver/control panel. The information transmitted typically describes the state of various sensors associated with each transmitter, such as smoke, motion, breaking glass, shock and vibration detectors, door, window, and floor mat switches; etc. The receiver receives the RF information and provides a digital data message to the control panel. The control panel decodes the data messages and performs activities based on the information it receives in the messages. The identification number (ID) of the transmitter is also included in the message to identify to the control panel which particular transmitter has sent the message, thereby allowing the control panel to perform the appropriate action.

During installation of a security system, an installer mounts a conventional control panel and the appropriate sensor/transmitters that are required for the site. Each transmitter contains an ID, which has been programmed during manufacture, to differentiate it from other transmitters in the system. In order for the control panel to be responsive to a transmitted message, the ID of all the transmitters in the system and the type of sensor data they are transmitting must be programmed or “learned” by the control panel. To accomplish this, the installer first initiates an install mode by keying in the install code into the security system console. The installer next performs an install routine which include entering the ID of each transmitter into the control panel. Currently, the installer enters the ID into the control panel in one of four different methods: 1) keying into a console the ID from a label attached to the transmitter case; 2) keying in the ID via a download from a remote office; 3) placing the transmitter into a “learn mode” and transmitting RF ID data over the air which is received and stored into the control memory; and 4) using a transmitter with a light emitting diode (LED) to communicate the ID to a light sensitive device located in the receiver. Once the control panel receives the ID it stores it into its memory and continues the installation routine until the installer keys in the normal operation code into the security system console.

The current techniques of entering the ID into the control panel have several disadvantages. Both keyed methods require a label, which may become detached and lost during transportation of the transmitter. Both of these methods are also prone to human error. The RF learning method which requires an RF transmission of data over the air, may be interfered with by RF transmissions from other transmitters in the vicinity, and the LED learning requires extra hardware (i.e. cost) in each transmitter and receiver.

The present invention overcomes these disadvantages by providing each installer with a low cost installation device, which allows the IDs to be learned without these difficulties. The installation device interfaces easily to the transmitters and the control panels by cables with standard connectors. The cables protect the data from being interfered with by other RF transmissions. The method of operating the installation device is simple and constant requiring no keying and providing little opportunity for human error. Since the installation device is used for many security systems installations, the cost is spread out and is minimal compared to the cost of installing LEDs in each transmitter and light sensitive devices in each receiver.

In addition, the device of the present invention may be used in a factory that produces large quantities of transmitters. The device may be incorporated into test equipment that generates labels for the transmitters, thereby alleviating the possibility of RF crosstalk from nearby equipment in the factory also transmitting RF signals.

It is therefore an object of the present invention to provide an installation device and a method for transferring an identification number of a wireless transmitter to a control panel.

It is a further object of the present invention to provide an installation device and a method that does not require the reception of an RF transmission in order for the control panel to learn the unique ID of a wireless transmitter.

It is a still further object of the present invention to provide an installation device that is easily connected to the wireless transmitter.

It is a further object of the present invention to provide an installation device that is easily connected to the control panel.

It is a further object of the present invention to provide an installation device that communicates to the control panel using a common interface bus.

SUMMARY OF THE INVENTION

In accordance with these and other objects, the present invention is a device and a method used during installation of a security system that allows the security system control panel to learn the IDs of the wireless transmitters in the system. Security systems typically comprise a plurality of wireless transmitters, each with a unique ID. The wireless transmitters transmit RF messages that describe the state of a sensor, for example glass breakage or motion detected. The RF messages are received by an RF receiver and are converted to digital messages which are transmitted to the control panel via a hardwired data bus. The control panel decodes the ID and the data from the messages and performs the appropriate actions, such as sounding an alarm. In order for the control panel to perform the appropriate actions, it must be programmed to recognize the IDs in each message and to associate the IDs with a particular sensor. This is accomplished during installation when the installer causes the control panel to learn the ID of each transmitter in the system. The present invention is a unique device and method that allows the control panel to learn the IDs of each transmitter.

The installation device is connected to the transmitter at its battery terminal and to the control panel using the same interface bus the receiver uses to interface to the control panel. The installation device comprises a power supply means, a first and second interface means, monitoring means for monitoring the current drawn from the power supply means, and processing means for producing a digital signal based on the current monitored. The installation device may be contained in a hand holdable housing, or may be integrated within a console. The first interface means is a pair of test leads that connect the power supply means of the installation device to the battery terminal of a transmitter. When the transmitter transmits data, current is drawn from the power supply of the installation device. The current drawn corresponds to the transmitted data, being higher when the transmitted data is a logic "1" and lower when the transmitted data is a logic "0". The monitoring means in the installation device is comprised of a resistor that generates a voltage level based on the current drawn from the power supply means and a comparator that compares the generated voltage level to a constant voltage level and produces a digital signal based on the comparison. The constant voltage level is set so that when the transmitter transmits a logic "1" the digital signal from the comparator is also a logic "1" and when the transmitter transmits a logic "0" the digital signal from the comparator is also a logic "0". The digital signal from the comparator is read by a microprocessor and transmitted via a common interface bus. A bus cable connects the microprocessor output to the interface bus. The console and the receiver are also connected to the interface bus, thereby creating a common bus input into the control panel.

The method of programming the control panel with the ID of a transmitter comprises the steps of connecting a power supply means to a power input port of the transmitter, initiating the transmitter to transmit its ID, monitoring the current drawn from the power supply means, producing a digital signal based on the current monitored, and providing the digital signal to the control panel for storage therein. An important feature of the present invention is that although the transmitter needs to transmit its ID, the receiver does not need to receive the ID in order for the control panel to learn the ID. This feature makes the present invention particularly useful in a manufacturing facility where there is RF interference from nearby equipment that may interfere with the RF transmission of the ID.

The method of the present invention may also be performed at an installation location during the installation mode, which occurs when the initialization command is keyed to the console. The method may also include removing a battery, if present, from the power input port of the wireless transmitter prior to the step of connecting the power supply means to the power input port of the wireless transmitter. Lastly, initiating the transmitter to transmit the identification number is accomplished by connecting the power supply means to the power input port or by activating a manual switch located on the transmitter, that causes an RF transmission of the transmitter's ID.

DETAILED DESCRIPTION OF THE PREFERRED EMBODIMENT

Figure 1:
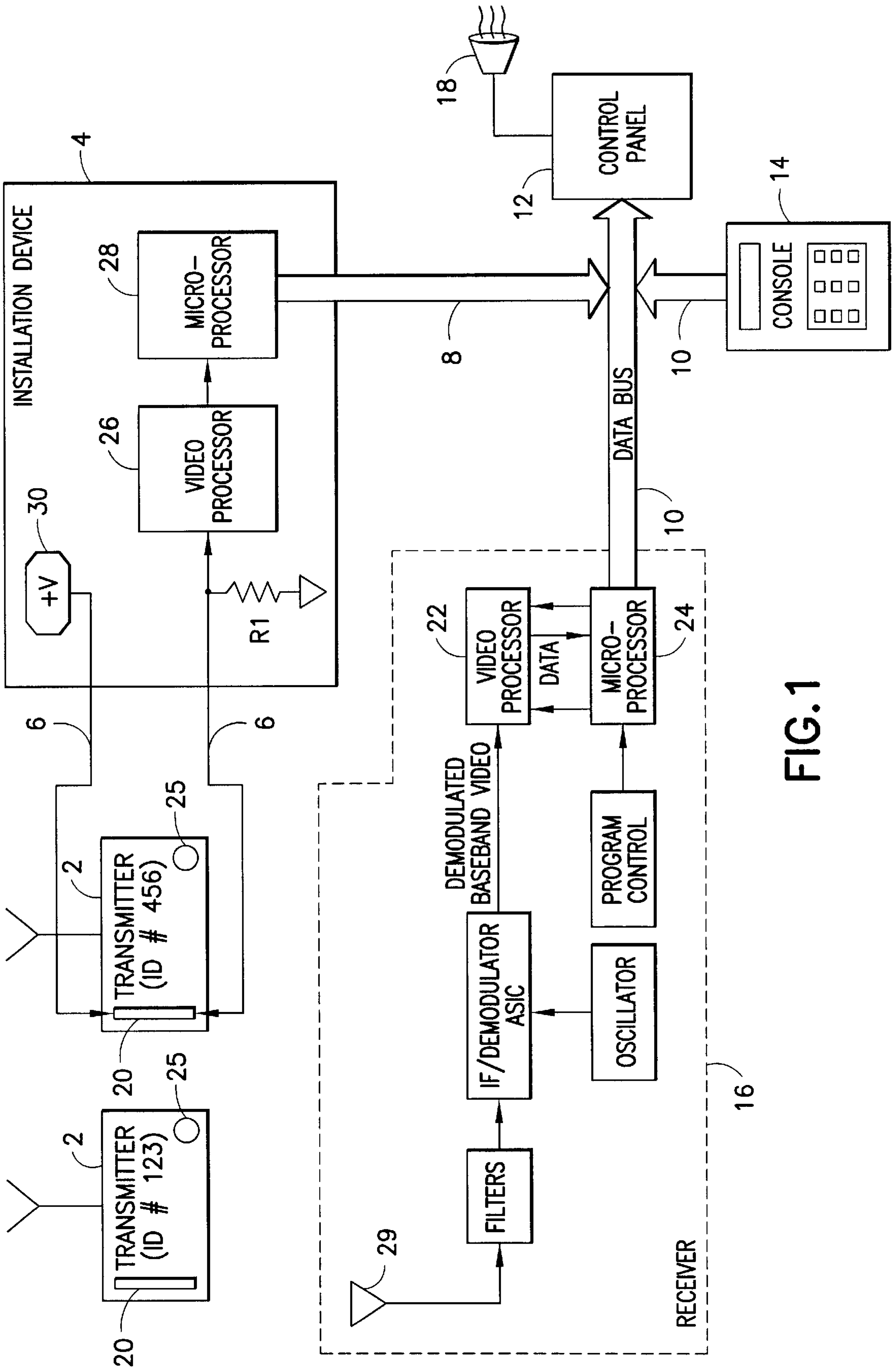
FIG. 1 is a block diagram of the preferred embodiment of the present invention.

Referring to FIG. 1, shown is the preferred embodiment of the installation device 4 that comprises a voltage source 30, a resistor R1, a video processor 26, a microprocessor 28, a data bus interface 8 and a transmitter interface 6. Also shown is a security system that comprises a receiver 16, a control panel 12, a console 4, and wireless transmitters 2. During normal operation of the security system, the transmitters 2 transmit sensor data to the receiver 16 through antenna 29. The sensor data is filtered, demodulated, and processed by video processor 22. The data is transmitted by the microprocessor 24 to the control panel 12 via a common data bus 10. The control panel 12 processes the data and performs the appropriate actions, such as sounding the alarm 18.

Figure 2:
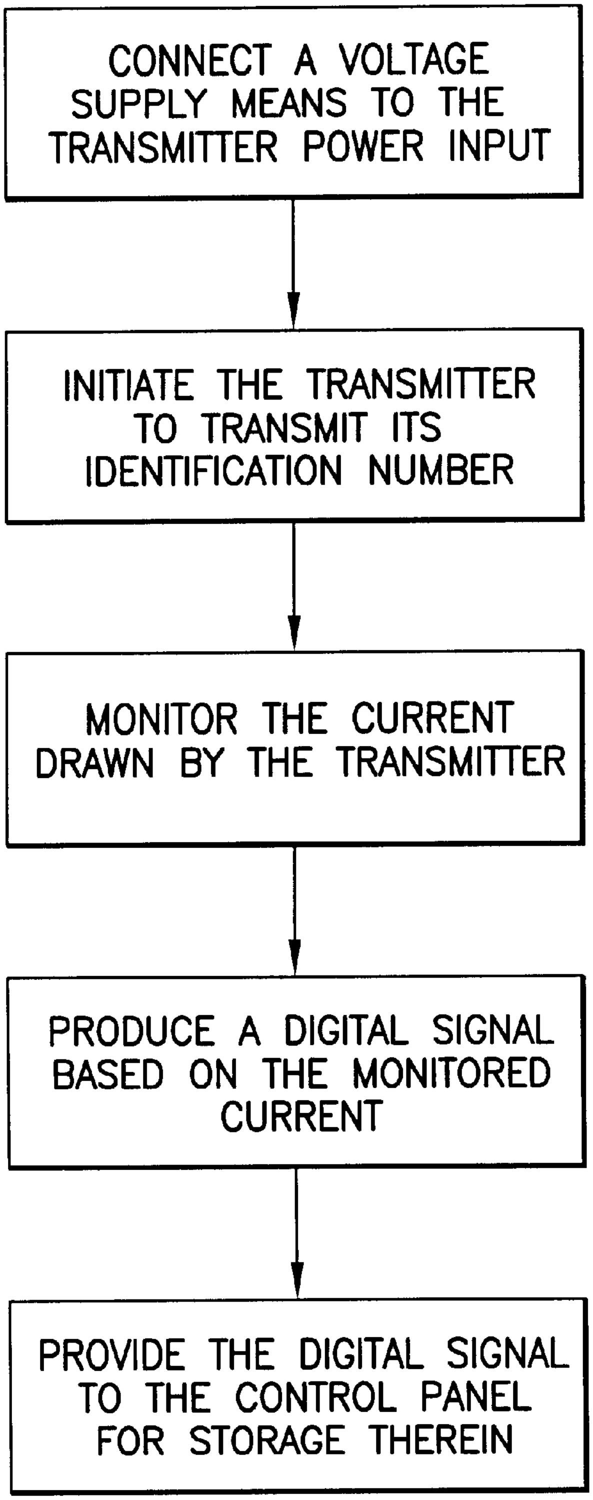
FIG. 2 is a flow diagram of the method of the preferred embodiment of the present invention.

Prior to normal operation an installer must program the security system to recognize and accept information from the transmitters 2 in the system. An installation mode is initiated in the control panel 12 by keying in the appropriate code into the console 14, which is transmitted to the control panel 12 via the common data bus 10. The installer then performs an installation routine, which is well known to one skilled in the art. During the installation routine the transmitter ID is programmed into the control panel. The method of programming or learning the transmitter ID is shown in FIG. 2. The data bus interface 8 is connected to the data bus 10. After removing the battery 20 from the transmitter 2 (if it has been installed), test leads 6 are connected from the voltage supply 30 of the installation device 4 to the battery terminals (under battery 20) on the transmitter 2. The transmitter 2 transmits its ID automatically upon receiving power. The installer may also initiate the transmitter 2 to transmit its ID by activating manual switch 25 or by causing it to transmit a message in its normal course of operation, e.g. by causing it to detect an alarm condition. While the transmitter 2 is transmitting its ID, the installation device 4 is monitoring the current drawn by the transmitter 2. The video processor 26 produces a digital signal from the voltage level produced by the current drawn by the transmitter 2. Finally, the microprocessor 28 provides the digital signal along with other control signals to the control panel 12. The control panel 12 stores the ID by techniques well known to one skilled in the art. The transmitter ID learning is performed for every transmitter 2 in the system. Once the installation routine is completed, the installer removes the installation device 4 from the security system, put the batteries 20 back into the transmitters 2 and initiates a normal mode of operation by keying in the appropriate code into the console 14. Although this invention requires the transmission of the ID from transmitter 2, it does not require the receiver 16 to receive the ID in order to program the control panel 12 with the ID of the transmitter 2.

Figure 3:
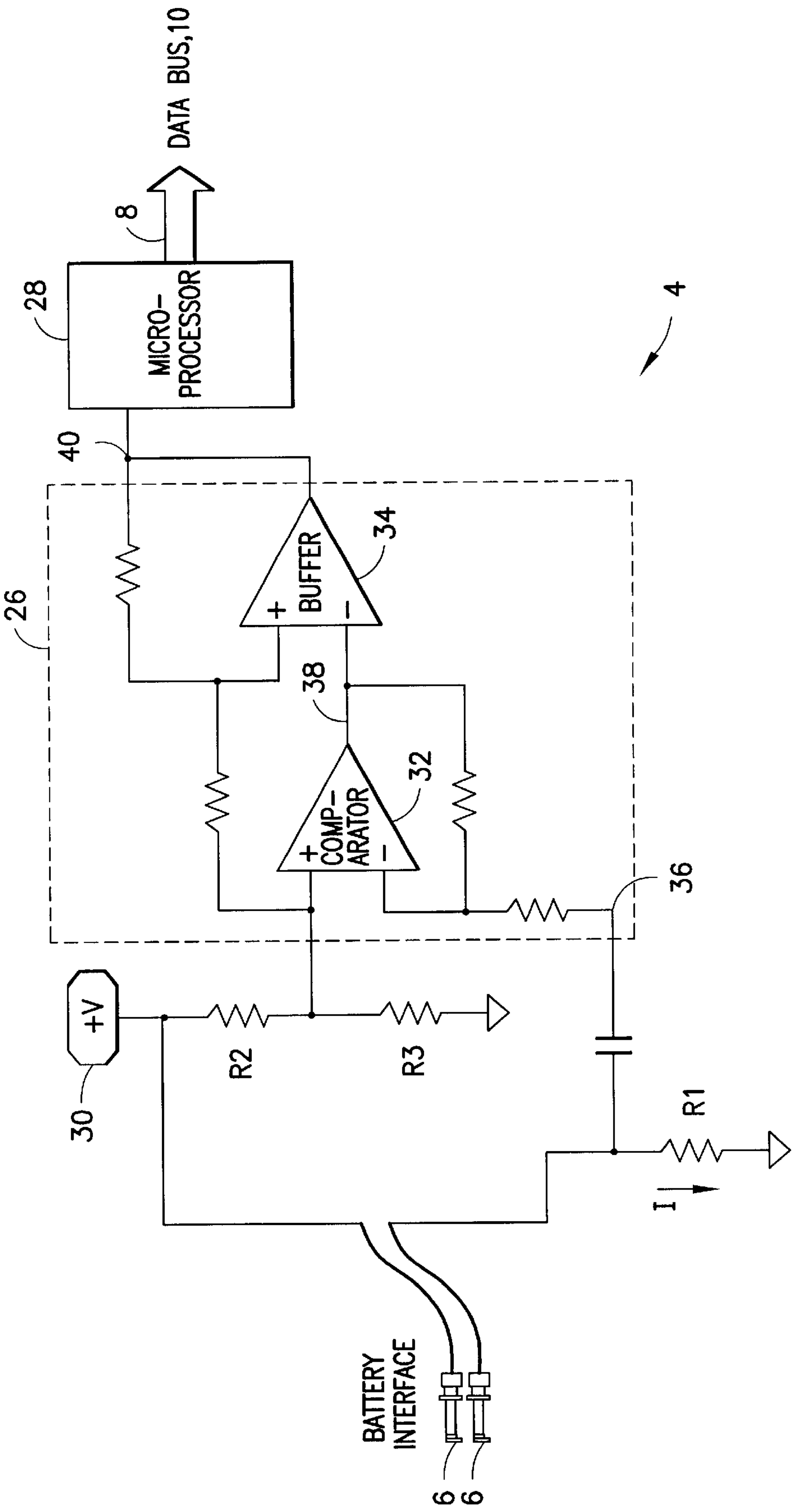
FIG. 3 is a diagram of the preferred embodiment of an installation tool.

The components of the installation device 4 are shown in FIG. 3. A voltage supply 30 is connected to the transmitter 2 via a test lead 6. A monitoring resistor R1 is also connected to the transmitter 2 via a second test lead 6. The current through the resistor R1 is dependent on the current drawn by the transmitter 2. The transmitter 2 uses a variable amount of current to transmits its ID, wherein a transmission of a logic "1" requires more current draw than a logic "0". The current through R1 produces a voltage signal that corresponds to the data being transmitted by the transmitter 2. The voltage signal is compared, by comparator 32, to a constant voltage level produced by resistors R2 and R3. The constant voltage level is chosen so that a transmission of a logic "1" from the transmitter 2 produces a logic "1" output from comparator 38. The comparator output signal 38 is buffered by buffer 34 to provide signal 40, which is identical to the ID transmitted by the transmitter 2. Signal 40 is formatted by the microprocessor 28 and transmitted to the control panel 12 via data bus 10. The data bus interface 8 is a bus cable that connects the installation device to the data bus 10.

Figure 4:
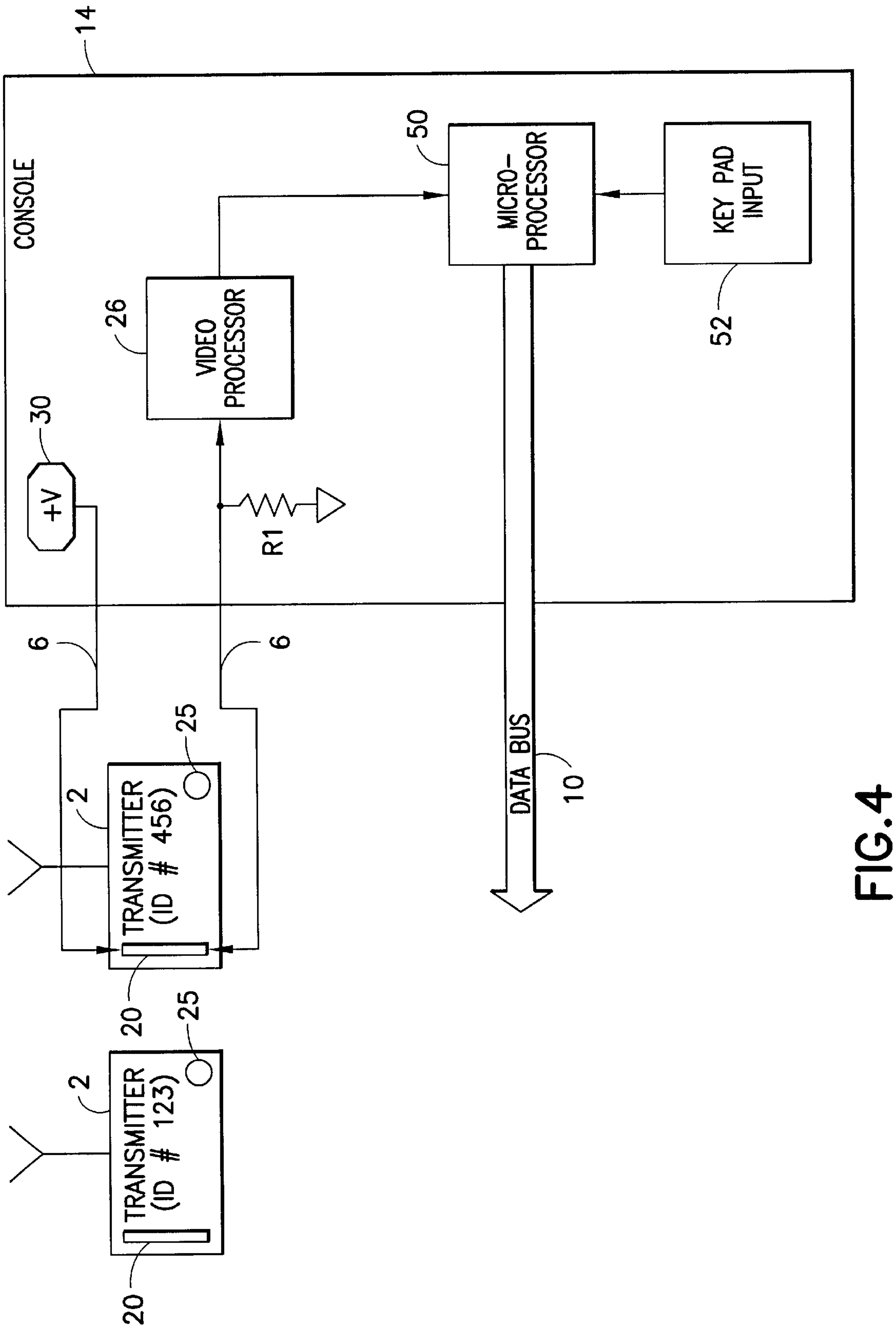
FIG. 4 is a block diagram of an alternative embodiment of the present invention.

An alternative embodiment of the present invention is shown in FIG. 4. In this embodiment, the installation device 4 is integrated within the console 14. A microprocessor 50 receives inputs from the keypad input 52 and the video processor 26 and transmits data to the control panel 12 via the databus 10. The microprocessor 50 executes the functions of both the console 14 and the installation device 4. In this embodiment, the software of the installation device can be incorporated together with the console software eliminating the need for a separate microprocessor (#28). In this embodiment, the control panel 12 learns the transmitter ID in the same manner as described in the preferred embodiment.

It will be apparent to those skilled in the art that modifications to the specific embodiments described herein may be made while still being within the spirit and scope of the present invention. For example the installation device may be used for modes other than installation mode to transfer data from a wireless device to the control panel, thereby making a wireless device wired. In addition a Hall-effect probe may replace the resistor R1. Also, the transmitter may transmit more information in addition to its ID. Lastly, the installation device may interface to the control panel using a different interface than the common data bus of the security system.

We claim:

1. In a security system comprising a plurality of wireless transmitting devices, a receiver configured for wireless communication with the transmitting devices, and a control panel in communication with the receiver, wherein each of the transmitting devices comprises a unique identification number; a method of programming the control panel with the identification number of a transmitting device comprising the steps of:

a) connecting a power supply means to a power input port of the transmitting device, b) initiating the transmitting device to transmit a radio frequency signal encoded with the identification number, c) monitoring the current drawn from the power supply means by the transmitting device during transmission of the radio frequency signal encoded with the identification number, d) producing a digital signal based on the current monitored from the power supply, the digital signal encoded with the identification number, and e) providing the digital signal to the control panel for storage in a transmitter identification number table therein.

2. The method of claim 1 further comprising the step of initiating an installation mode in the control panel prior to the step of connecting a power supply means to the power input port of the transmitting device.

3. The method of claim 1 wherein the steps (a) through (e) are performed at the installation location.

4. The method of claim 1 wherein the steps (a) through (e) are performed at a manufacturing facility.

5. The method of claim 2 wherein the step of initiating an installation mode in the control panel is performed by user input to a console.

6. The method of claim 1 further comprising the step of removing a battery from the power input port prior to the step of connecting a power supply means to a power input port.

7. The method of claim 1 wherein the step of connecting a power supply means to a power input port of the transmitting device is accomplished by connecting test leads from an installation device to the transmitter battery terminals.

8. The method of claim 1 wherein the step of initiating the transmitting device to transmit a radio frequency signal encoded with the identification number is accomplished by activating a manual switch.

9. The method of claim 1 wherein the step of initiating the transmitting device to transmit a radio frequency signal encoded with the identification number is accomplished by connecting the power supply means to the power input port.

10. The method of claim 1 wherein the step of monitoring the current drawn from the power supply means by the transmitting device during transmission of the radio frequency signal encoded with the identification number comprises the steps of:

a) generating a voltage level based on the current drawn from the power supply means, b) comparing the generated voltage level to a constant voltage level, c) producing a digital signal based on the comparison.

11. The method of claim 10 wherein generating a voltage level based on the current drawn from the power supply means is performed by a resistor.

12. The method of claim 1 wherein the step of producing a digital signal based on the current monitored is performed by a microprocessor.

13. The method of claim 1 wherein the step of providing the digital signal to the control panel is performed over a common interface bus.

14. A device for programming a security system control panel with the identification number of a transmitting device comprising:

a) power supply means, b) first interface means for connecting the power supply means to a wireless transmitting device, c) monitoring means for monitoring the current drawn from the power supply means by the transmitting device during transmission of a radio frequency signal encoded with the identification number, d) processing means for producing a digital signal based on the current monitored, the digital signal being representative of the identification number, and e) second interface means for providing the digital signal to the control panel for storage in a transmitter identification number table therein.

15. The device of claim 14 wherein the first interface means for connecting the power supply means to a wireless transmitting device comprises a pair of test leads from the power supply means to battery terminals associated with the wireless transmitting device.

16. The device of claim 14 wherein the monitoring means comprises:

a) a resistor that generates a voltage level based on the current drawn from the power supply means, b) a comparator that compares the generated voltage level to a constant voltage level and produces a digital signal based on the comparison.

17. The device of claim 14 wherein the second interface means is a common interface bus.

18. The device of claim 17 wherein the common interface bus further interfaces to a console.

19. The device of claim 17 wherein the common interface bus further interfaces to a receiver.

20. The device of claim 14 wherein the power supply means, the first interface means, the monitoring means, the processing means and the second interface means are contained in a hand holdable housing.

21. The device of claim 18 wherein the power supply means, the first interface means, the monitoring means, the processing means and the second interface means are integrated within the console.

* * * * *